Patented July 3, 1923.

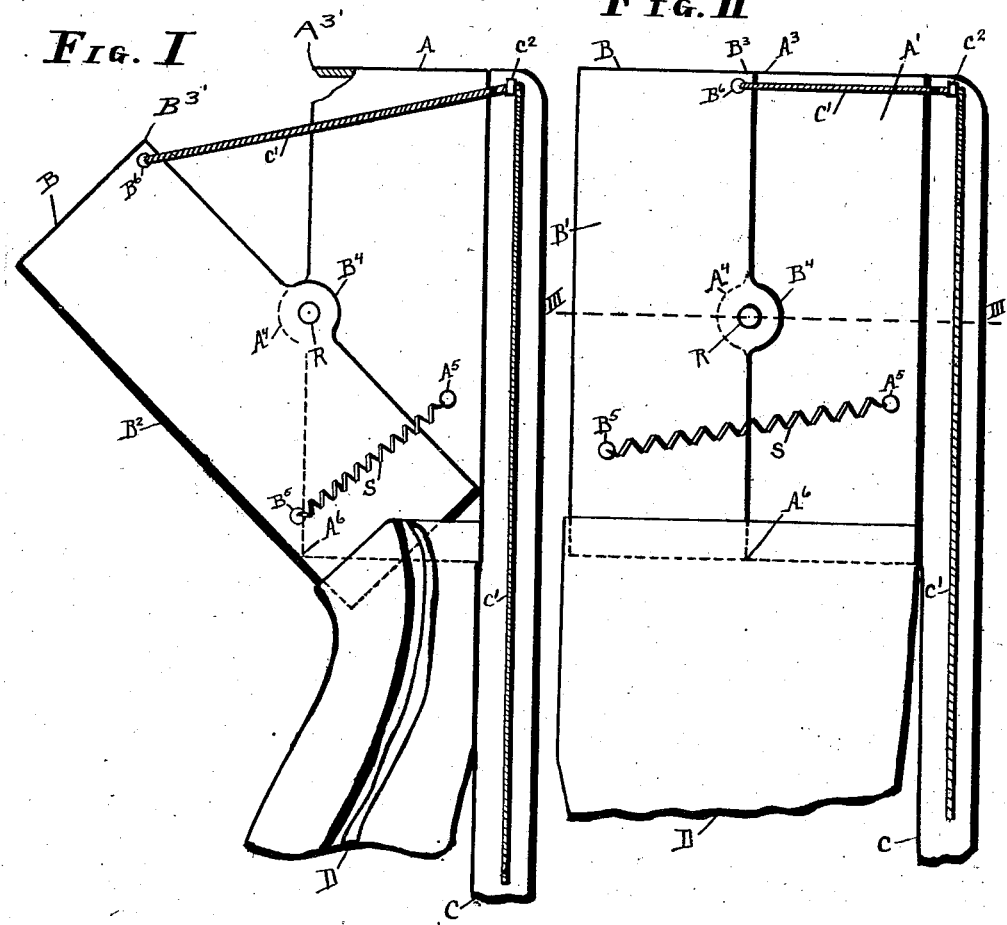

1,460,755

UNITED STATES PATENT OFFICE.

ROY A. HOWE AND JOHN F. IRISH, OF BANTAM, CONNECTICUT.

FRUIT PICKER.

Application filed January 21, 1922. Serial No. 530,835.

*To all whom it may concern:*

Be it known that we, ROY A. HOWE and JOHN F. IRISH, citizens of the United States, residing at Bantam, in the county of Litchfield, in the State of Connecticut, have invented certain new and useful Improvements in Fruit Pickers, of which the following is a specification.

Our invention consists in a new and useful improvement in fruit pickers and is designed to provide a cutting head which is carried aloft upon a staff and operated by a cord from the ground. Our improved cutting head is of simple and durable construction and also effective in operation. We have secured these advantages by providing two co-acting metal receptacles which are adapted to enclose the fruit and sever the stem when they are closed, thus allowing the fruit to pass through the cutting head and into a flexible conveyor tube attached to the head.

We are aware of the fact that there are many devices of this general type and the novel features of our invention afford several distinct advantages over the other devices in this class of fruit pickers. We have found that it is necessary to design the cutting head so that there shall be no possibility of the fruit striking against the metal walls of the receptacles, and thus becoming bruised, when it is allowed to fall, upon the severing of the stem. Our cutting head is so fashioned that the passageway for the fruit therethrough is adjusted to its maximum capacity at the moment when the stem of the fruit is severed.

We have also found that the durability of the device is greatly enhanced if the two receptacles are hinged together at a point midway between the cutting jaws, on their upper edges, and the lower edges of the receptacle, rather than at the lower edges. Our cutting head is therefore so designed that part of one of the receptacles is received over part of the other receptacle when the head is opened to receive the fruit therein. In this connection we have secured a very important advantage by so relating the parts that the edges of the inner receptacle form a stop to limit the movement of the outer receptacle thus affording additional stability to the device. The parts are so proportioned that the maximum degree of opening of the head is secured.

We have also found that the efficiency of the device is greatly increased by so relating the operating cord to the head and the staff that the impulse exerted through the cord may operate in a line at right angles to the cutting edges of the head at the moment of severing the stem of the fruit.

Our invention is fully disclosed in the details of construction illustrated in the drawings and hereinafter fully described, but it is to be understood that we have indicated herein only one specific embodiment of our invention and refer for its scope to the claim appended hereto.

In the drawings:

Fig. 1 is a side elevation of a fruit picker embodying our invention, the cutting head being indicated in normal open relation.

Fig. 2 is a similar view, showing the cutting head in closed relation.

Fig. 3 is a horizontal section through the device, on the line 3—3 of Fig. 2.

Our improved cutting head is composed of the two metal receptacles A and B formed with the side walls $A^1$, $A^1$ and $B^1$, $B^1$, the back walls $A^2$ and $B^2$, and the tops $A^3$ and $B^3$, provided with the cutting edges $A^{3\prime}$ and $B^{3\prime}$ respectively. The side walls $A^1$, $A^1$ are provided at the middle of their outer edges with the outstanding semi-circular ears $A^4$, $A^4$, and the walls $B^1$, $B^1$ are also provided with similar ears $B^4$, $B^4$. The receptacles A and B are so proportioned and related that the ears $A^4$, $A^4$ are inserted into the receptacle B adjacent the walls $B^1$, $B^1$, as indicated in Fig. 3. Rivets R, R, concentrically positioned relative to the two sets of ears $A^4$, $A^4$ and $B^4$, $B^4$, serve to hingedly connect the two receptacles A and B.

Our improved cutting head is attached to the staff C by suitable fastening means (not shown) transfixing the wall $A^2$ of the receptacle A, which is thus held parallel to the staff C. At points below the hinge connections of the receptacles A and B, they are provided with small holes $A^5$ and $B^5$ respectively, in which are fastened the ends of a contraction coil spring S. It will be obvious from the drawings that the action of the spring S will cause the lower part of the receptacle B to swing toward the staff C, thus causing the sides $B^1$, $B^1$ to ride over the sides $A^1$, $A^1$. This movement of the receptacle B will continue until the back wall $B^2$ of the receptacle B comes into contact with the points $A^6$ of the outer edges of the sides $A^1$, $A^1$, which form stops to limit the movement of the receptacle B. The action of the spring S thus holds the cutting head in its normal position as shown in Fig. 1.

One of the walls $B^1$ of the receptacle B is provided with a small hole $B^6$ at a point immediately adjacent the outer edge of the top $B^3$. In this hole $B^6$ there is secured the end of the operating cord $C^1$. An eye $C^2$ is located in the upper end of the staff C and the cord $C^1$ passes through this eye $C^2$ and is then carried down along the staff C. The eye $C^2$ is so disposed relative to the cutting head that when the cord $C^1$ is drawn to close the cutting head, the portion of the cord between the hole $B^6$ and the eye $C^2$ will be at right angles to the meeting edges of the receptacles A and B.

A flexible conveyor D of any suitable material has its upper open end surrounding the open bottom of the cutting head and is appropriately fastened to the bottoms of the receptacles A and B.

It will be obvious from the foregoing description of the parts of our device that when the operating cord $C^1$ is drawn the tops $A^3$ and $B^3$ are caused to approach and at their moment of meeting their outer edges $A^{3\prime}$, $B^{3\prime}$ acting as cutting jaws will sever the stem of the fruit which is contained in the cutting head. By reason of the fact that the two receptacles A and B are hingedly connected by the ears $A^4$, $A^4$ and $B^4$, $B^4$, when the cutting head is closed the sides $A^1$, $A^1$ and $B^1$, $B^1$ do not overlap. Therefore at the moment of cutting, the cutting head is distended to its full capacity and there is consequently no chance for the fruit to become jammed or strike against the walls of the cutting head and thus become bruised. It will also be noted that by reason of this status of the cutting head, at the moment of cutting, the flexible conveyor D is distended to its full capacity.

Having described our invention, what we claim is:

In a fruit picker cutting head, the combination of a receptacle provided with two side walls; an outwardly projecting semi-circular ear located at the middle of one edge of each of said side walls; a second receptacle provided with two side walls; an outwardly projecting semi-circular ear located at the middle of one edge of each of said side walls, the two ears on the first receptacle being adapted to lie adjacent the inner surfaces of the side walls of the second receptacle, and the two ears on the second receptacle being adapted to lie adjacent the outer surfaces of the side walls of the first receptacle; and a rivet concentrically located relative to the two adjacent ears on each side of the head, said rivets being adapted to hingedly connect the said receptacles.

In testimony whereof we affix our signatures.

ROY A. HOWE.
JOHN F. IRISH.